US 008643621B2

(12) United States Patent
Yilmaz

(10) Patent No.: US 8,643,621 B2
(45) Date of Patent: Feb. 4, 2014

(54) TOUCH-SENSITIVE USER INTERFACE

(75) Inventor: Esat Yilmaz, Santa Cruz, CA (US)

(73) Assignee: Atmel Corporation, San Jose, CA (US)

( * ) Notice: Subject to any disclaimer, the term of this patent is extended or adjusted under 35 U.S.C. 154(b) by 2 days.

(21) Appl. No.: 13/614,923

(22) Filed: Sep. 13, 2012

(65) Prior Publication Data

US 2013/0100052 A1 Apr. 25, 2013

Related U.S. Application Data

(63) Continuation of application No. 12/539,421, filed on Aug. 11, 2009, now Pat. No. 8,279,189.

(51) Int. Cl.
*G06F 3/041* (2006.01)
*G06F 3/048* (2013.01)

(52) U.S. Cl.
USPC .......................... 345/173; 715/862

(58) Field of Classification Search
USPC .................. 345/173–183; 715/702, 862
See application file for complete search history.

(56) References Cited

U.S. PATENT DOCUMENTS

| | | | |
|---|---|---|---|
| 5,730,165 A | 3/1998 | Philipp | |
| 6,452,514 B1 | 9/2002 | Philipp | |
| 6,466,036 B1 | 10/2002 | Philipp | |
| 6,993,607 B2 | 1/2006 | Philipp | |
| 7,663,607 B2 | 2/2010 | Hotelling | |
| 7,875,814 B2 | 1/2011 | Chen | |
| 7,903,092 B2 | 3/2011 | Philipp | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 2007/0273561 A1 | 11/2007 | Philipp | |
| 2009/0315854 A1 | 12/2009 | Matsuo | |
| 2012/0242588 A1 | 9/2012 | Myers | |
| 2012/0242592 A1 | 9/2012 | Rothkopf | |
| 2012/0243151 A1 | 9/2012 | Lynch | |
| 2012/0243719 A1 | 9/2012 | Franklin | |

FOREIGN PATENT DOCUMENTS

| | | |
|---|---|---|
| GB | 2438716 A | 12/2007 |
| WO | WO-2007/071892 | 6/2007 |
| WO | WO-2008/007218 | 1/2008 |
| WO | WO 2012/129247 | 9/2012 |

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

*Primary Examiner* — Kevin M Nguyen
(74) *Attorney, Agent, or Firm* — Baker Botts LLP

(57) ABSTRACT

A touch-sensitive user interface includes a sensor element providing a plurality of sensing areas, a measurement circuit coupled to the sensor element and operable to iteratively acquire measurement signal values indicative of the proximity of an object to the respective sensing areas, and a processor operable to receive the measurement signal values from the measurement circuit and to classify a sensing area as an activated sensing area for a current iteration according to predefined selection criteria, wherein the predefined selection criteria are such that activation of at least a first sensing area in a current iteration is suppressed if at least a second sensing area has previously been classified as an activated sensing area within a predefined period before the current iteration. Thus a sensing area may be prevented from being activated for a predefined period of time after another sensing area has been activated.

25 Claims, 5 Drawing Sheets

Table 2: Suppression periods
(in measurement cycles)

"Suppressee" sensing area

| "Suppressor" sensing area | | A | B | C | D | S1 | S2 | S3 | S4 | S5 | X |
|---|---|---|---|---|---|---|---|---|---|---|---|
| | A | | 20 | 0 | 0 | 20 | 20 | 0 | 0 | 0 | 0 |
| | B | 20 | | 20 | 0 | 0 | 20 | 20 | 20 | 0 | 0 |
| | C | 0 | 20 | | 20 | 0 | 0 | 0 | 20 | 20 | 0 |
| | D | 0 | 0 | 20 | | 0 | 0 | 0 | 0 | 20 | 20 |
| | S1 | 20 | 0 | 0 | 0 | | 0 | 0 | 0 | 0 | 20 |
| | S2 | 20 | 0 | 0 | 0 | 0 | | 0 | 0 | 0 | 40 |
| | S3 | 0 | 20 | 0 | 0 | 0 | 0 | | 0 | 0 | 60 |
| | S4 | 0 | 0 | 20 | 0 | 0 | 0 | 0 | | 0 | 80 |
| | S5 | 0 | 0 | 20 | 20 | 0 | 0 | 0 | 0 | | 100 |
| | X | 0 | 0 | 0 | 20 | 0 | 0 | 0 | 0 | 20 | |

Table 1: Inactivity period counters

| Key | Inactivity period |
|-----|-------------------|
| A   | 50                |
| B   | 255               |
| C   | 1                 |
| D   | 255               |
| S1  | 255               |
| S2  | 255               |
| S3  | 255               |
| S4  | 255               |
| S5  | 255               |
| X   | 255               |

Table 2: Suppression periods
(in measurement cycles)

"Suppressee" sensing area

| | A | B | C | D | S1 | S2 | S3 | S4 | S5 | X |
|---|---|---|---|---|---|---|---|---|---|---|
| A |  | 20 | 0 | 0 | 20 | 20 | 0 | 0 | 0 | 0 |
| B | 20 |  | 20 | 0 | 0 | 20 | 20 | 20 | 0 | 0 |
| C | 0 | 20 |  | 20 | 0 | 0 | 0 | 20 | 20 | 0 |
| D | 0 | 0 | 20 |  | 0 | 0 | 0 | 0 | 20 | 20 |
| S1 | 20 | 0 | 0 | 0 |  | 0 | 0 | 0 | 0 | 20 |
| S2 | 20 | 0 | 0 | 0 | 0 |  | 0 | 0 | 0 | 40 |
| S3 | 0 | 20 | 0 | 0 | 0 | 0 |  | 0 | 0 | 60 |
| S4 | 0 | 0 | 20 | 0 | 0 | 0 | 0 |  | 0 | 80 |
| S5 | 0 | 0 | 20 | 20 | 0 | 0 | 0 | 0 |  | 100 |
| X | 0 | 0 | 0 | 20 | 0 | 0 | 0 | 0 | 20 |  |

"Suppressor" sensing area

Fig. 3

TOUCH-SENSITIVE USER INTERFACE

RELATED APPLICATIONS

This nonprovisional application is a continuation of U.S. application Ser. No. 12/539,421, filed Aug. 11, 2009, and entitled "Touch-Sensitive User Interface."

FIELD

The invention relates to touch-sensitive user interfaces, and more particularly to touch-sensitive user interfaces that include a plurality of sensing areas.

BACKGROUND

Touch-sensitive user interfaces that include touch-sensitive sensing areas are used in many types of devices. In some existing user interfaces based on touch-sensitive sensing areas mistakes may be made in correctly determining which of the sensing areas is to be intended for selection (i.e. which areas are to be considered activated). Such mistakes may arise because the measurement signal values that are associated with the different sensing areas in a touch sensitive user interface (e.g. measurements of capacitance) are not generally binary indications, but are continuously variable. A controller is thus employed to analyze the measurement signal values for the various sensing areas and to determine which keys are to be considered as being currently activated from their associated measurement signals.

The general trend towards smaller interfaces with increased functionality increases the complexity of properly determining sensing areas intended to be selected. Smaller touch-sensitive user interfaces have more densely packed sensing areas such that a user's finger (or other pointing object) is more likely to overlap multiple keys at the same time or in too-quick succession. Furthermore, cover panels for touch-sensitive user interfaces are often flat such that there is no tactile feedback available to help a user to correctly position the pointing object over the desired region of the touch-sensitive user interface.

Basing key selection on a straightforward comparison of the magnitudes of the measured signal values, such as by selecting which key is currently associated with the greatest coupling signal above a selection threshold, does not always provide satisfactory performance. Even though some existing schemes may provide improved user-interface performance in many situations, there are still situations in which a user interfaces can be prone to error (e.g., by wrongly indicating that a sensing area (key) has been selected, when in fact a user did not intend to select this sensing area).

SUMMARY

A touch-sensitive user interface includes a sensor element that has a plurality of sensing areas. A measurement circuit is coupled to the sensor element and is operable to iteratively acquire measurement signal values indicative of the proximity of an object to the respective sensing areas. A processor receives the measurement signal values from the measurement circuit and classifies a sensing area as an activated sensing area for a current iteration according to predefined selection criteria.

The processor may generate output signals that are indicative of sensing areas classified as activated sensing areas because the predefined selection criteria are such that activation of at least a first sensing area in a current iteration is suppressed if a second sensing area has previously been classified as an activated sensing area within a predefined period before the current iteration. Therefore, the touch-sensitive user interface may help to address unintended activation of sensing areas within the touch-sensitive user interface because at least one sensing area of a user interface is prevented from being activated for a predefined period of time after a specified different sensing area has been activated.

BRIEF DESCRIPTION OF THE DRAWINGS

FIG. 3 illustrates a table of example pre-defined suppression periods for the sensor shown in FIG. 1.

DETAILED DESCRIPTION

Figures 1, 2:
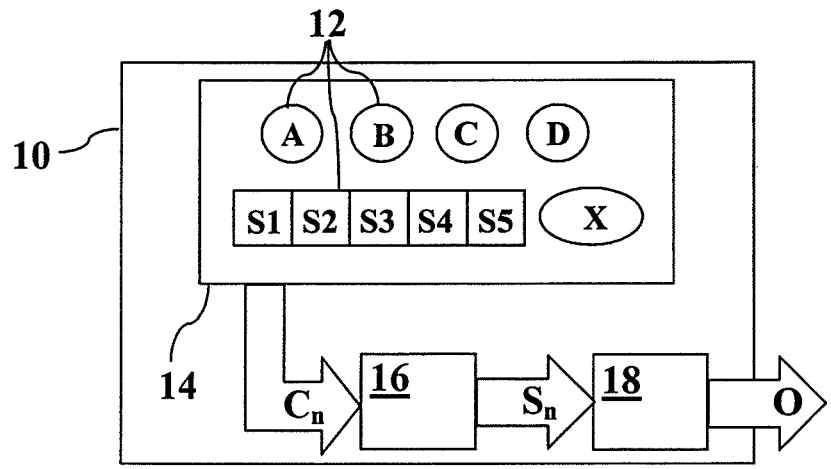
FIG. 1 is a schematic view of a touch-sensitive sensor according to an example embodiment.
FIG. 2 illustrates a table of example inactivity periods for the different sensing areas of the sensor shown in FIG. 1.

FIG. 1 illustrates an example touch-sensitive user interface 10 that operates based on capacitive sensing techniques. The touch-sensitive user interface 10 provides a series of touch-sensitive sensing areas 12 that a user may select by placing a pointing object, e.g. a finger or stylus, into proximity with the sensing areas 12 in order to control a device into which the interface 10 is incorporated (not shown in FIG. 1). The interface 10 comprises a sensor element 14, a capacitance measurement circuit 16, and a controller 18.

The sensor element 14 comprises the plurality of sensing areas 12, which may also be referred to as keys, sliders or touchscreens depending on the application and/or desired functionality of the touch-sensitive user interface 10. These sensing areas 12 may be defined by electrode material (e.g. Indium Tin Oxide—ITO) deposited on a substrate (e.g. a Polyethylene terephthalate (PET) sheet) in an appropriate pattern. In this example, the sensor element 14 comprises ten discrete sensing areas 12, which for the purposes of identification, are labeled A, B, C, D, S1, S2, S3, S4, S5 and X in FIG. 1.

The nature of a device/apparatus into which the example touch-sensitive user interface 10 may be incorporated is not significant. Thus, for the purposes of this example, the sensor element 14 is provided with an arbitrarily selected number of control inputs having an arbitrary physical layout. The number of control inputs and their physical layout will generally depend on the control requirements of a device into which the touch-sensitive user interface 10 is incorporated (e.g., the user interface designer's ergonomic/aesthetic considerations).

The sensing areas 12 of the sensor element 14 may be coupled to the measurement circuit 16 in any manner. The measurement circuit 16 is operable to measure a capacitance $C_n$ of each of the sensing areas 12, and to iteratively provide corresponding measurement signals $S_n$ to the controller 18.

The controller 18 is arranged to receive the measurement signals $S_n$ from the capacitance measurement circuit 16, and to process the measurement signals $S_n$ in order to classify one or more of the sensing areas 12 as being currently activated (i.e., these sensing areas deemed to have been selected by a user in the current measurement cycle). The controller 18 is further operable to generate an output signal O indicative of which sensing area(s) is (are) currently considered to be activated. The output signal O may thus be received by a master controller of a device (not shown in FIG. 1) in which the touch-sensitive user interface 10 is incorporated such that user inputs through the touch-sensitive user interface 10 may be used to control the device.

In this example, the sensing areas 12 provide five physically separated keys (A, B, C, D and X) and five keys grouped in a linear array (S1, S2, S3, S4, S5). The five physically separated keys A, B, C, D and X may be considered as discrete keys associated with corresponding discrete functions according to the operational requirement of a device being controlled via the touch-sensitive user interface 10. As an example, the keys may relate to stop, pause, skip back, skip forward, and play commands in a portable media player. In some embodiments, the five keys S1, S2, S3, S4, S5 that are grouped in a linear array may be considered together to provide a single one-dimensional position sensitive sensor (i.e., the measurement signals from these five sensing areas S1, S2, S3, S4, S5 may be processed as a group to determine a position of an object along the linear extent of the group of sensing areas S1, S2, S3, S4, S5). These sensing areas S1, S2, S3, S4, S5 may be used to control a continuously variable function (e.g., a volume output from a portable media player, or for scrolling through a listing of available songs on a portable media player).

The sensor element 14 and measurement circuit 16 aspects of the user-interface 10 may utilize a variety of charge transfer techniques. In addition, other techniques for iteratively providing sets of measurement signals $S_n$ associated with a plurality of sensing elements in a touch-sensitive user interface may also be used (e.g. based on heat or pressure sensing).

The measurement circuit 16 and controller 18 are shown as separate elements in FIG. 1 for ease of explanation. However, it will be appreciated that in some embodiments the functionality of the measurement circuit 16 and controller 18 may be provided by a single element (e.g., a single integrated circuit chip, a microprocessor, a field programmable gate array, or an application specific integrated circuit).

As noted above, problems can sometimes arise in properly determining which sensing areas in a touch sensitive user interface are to be considered as being activated in any given measurement cycle. For example, a common user input for the user interface of FIG. 1 might be for a user to drag their finger rapidly from sensing areas S1 to S5 (e.g., to scroll from left to right in a displayed menu, or to increase a volume output). In this case there is a chance the user may overshoot so that their finger ends up adjacent sensing areas X. If a user did not in fact intend to select sensing area X, it would be frustrating if the device being controlled were to respond as if sensing area X had been activated. Similarly, it is frustrating if a user is forced to take a great deal of care to position and move their finger so as to avoid any such overshoot.

The example touch-sensitive user interfaces and methods described herein may help to address such issues by providing a scheme in which a sensing area of a user interface is prevented from being activated for a predefined period of time after another specified sensing area has been activated. In addition, activation of different sensing areas of the user interface may be suppressed for different periods of time in response to different sensing areas have been previously activated. In some embodiments, the different suppression periods associated with different pairings of sensing areas may be selected according to the relative spatial arrangement of the various sensing areas in conjunction with the likelihood of users otherwise erroneously activating one key after previously activating another key.

As an example, with reference to FIG. 1, it may be considered that there is a higher likelihood of users erroneously placing their finger over sensing area X after having activated sensing area S5, rather than placing their finger over sensing area A after having activated sensing area S5. Thus, following activation of sensing area S5, activation of sensing area X may be suppressed for a first predefined time while sensing area A may be suppressed for a shorter period of time, or not suppressed at all (i.e., suppressed for zero time following activation of sensing area S5).

The time base in which periods of time may be measured can be defined in various ways. As an example, times may be defined in terms of seconds (or fractions thereof).

However, touch-sensitive sensors may also operate to iteratively provide sets of one or more measurement signals such that time periods are defined in terms of numbers of iterations. A single measurement signal acquisition iteration may be referred to as a measurement cycle. Thus, periods of time may be measured in terms of numbers of elapsed measurement cycles/iterations. In some embodiments, the measurement cycles might be regular (e.g., example 10 cycles per second) such that the number of iterations is a direct proxy for "real" time. However, in other embodiments, the measurement cycles may be irregular (e.g., because the user interface may be configured to enter a power-saving (sleep) mode with less frequent measurements being made if there has been no sensing areas deemed to be activated for a given period, or because quasi-random delays between iterations are used for noise spreading purposes).

The controller 18 keeps track of how long it has been—in terms of measurement cycles—since each of the sensing areas 12 was last deemed to be activated. In some embodiments, the controller 18 may store a table of inactivity counters that specifies an inactivity period for each sensing area 12 of the touch sensitive user interface 10.

FIG. 2 shows an example inactivity period table that may be used for the user interface of FIG. 1 at a time associated with the beginning of an arbitrary measurement cycle N. Each key (sensing area 14) is associated with an inactivity period counter value. The counter value for each key is a one-byte number that indicates the number of measurement cycles since the key was last considered activated (up to a maximum of 255 measurement cycles).

In some embodiments, the inactivity counter values are incremented for each key at the end of each measurement cycle (up to the maximum 255) with the inactivity counter values being reset to zero for any sensing areas that are classified during a measurement cycle as being activated.

There are other ways of implementing this in practice (e.g., by counting down rather than up to indicate increased periods of inactivity). As an example, inactivity counter values for activated sensing areas may be reset to 255 during a measurement cycle in which they are activated, with the inactivity counter values for each sensing area then being decremented at the end of each measurement cycle. The exact way in which the controller keeps track of/parameterizes the period of inactivity for each sensing area is not significant.

Thus referring to FIG. 2, it is apparent that sensing areas B, D, S1, S2, S3, S4, S5 and X have all been inactive for at least 255 measurement cycles prior to the current measurement cycle. In the illustrated example embodiment, sensing area A was activated more recently at 50 measurement cycles ago while sensing area C was considered an activated sensing area in the immediately preceding measurement cycle.

In order to determine whether or not a first sensing area should be suppressed in a current iteration in response to a second sensing area having been activated in a previous iteration, a time period for which the first one of the sensing areas is suppressed following selection of the second one of the sensing areas is predefined. As noted above, this predefinition may be done by taking into account the spatial layout of the sensing areas in the user interface in conjunction with the expected manner in which a user will wish to activate the sensing areas during normal use. As an example, sensing area X in FIG. 1 may be suppressed for a longer time than sensing area A following activation of sensing area S5 for the reasons given above.

Thus, a suppression time period is predefined for each pairing of sensing areas to which the suppression scheme of various embodiments may be applied. In addition, the predefined suppression period for a first sensing area following a deemed activation of a second sensing area need not necessarily be the same as the predefined suppression period for suppressing the second sensing area following activation of the first sensing area. As an example, sensing area X may be suppressed for a relatively long time following activation of sensing area S5 (for the reasons given above), but in the "reverse" case, sensing area S5 may be suppressed for a shorter time, or not at all, following activation of sensing area X. Thus, for each sensing area pairing, there may be two predefined suppression periods depending on which one of the sensing areas activated first.

As used herein a first sensing area may be suppressed for a predefined period following activation of a second sensing area. The second sensing area may be referred to here as a "suppressor" sensing area, and the first sensing area may be referred to here as a "suppressee" sensing area.

FIG. 3 shows an example table of predefined inactivity thresholds/suppression periods for each pairing of sensing areas for the user interface shown in FIG. 1. Two suppression periods are defined for each pairing according to which sensing area in the pairing is the suppressor and which is the suppressee. Thus, the predefined periods for which a given sensing area is suppressed following activation of different ones of the other sensing areas can be read off from the columns in the table of FIG. 3. Similarly, the predefined periods for which activation of a given sensing area suppresses activation of different ones of the other sensing areas can be read off from the rows in the table of FIG. 3.

In the illustrated example embodiment, following activation of sensing area S5 (i.e. for S5 as suppressor), the predefined suppression periods for the other sensing areas may be read off from the row for sensing area S5. Thus these periods are: zero measurement cycles for sensing areas A, B, S1, S2, S3 and S4 (i.e. no suppression); twenty measurement cycles for sensing areas C and D; and one hundred measurement cycles for sensing area X. Similarly, the predefined periods for which S5 is suppressed following activation of one of the other sensing areas are: zero measurement cycles following activation of sensing areas A, B, S1, S2, S3 and S4 (i.e. no suppression); and twenty measurement cycles following activation of sensing areas C, D and X.

The specific predefined suppression periods may be selected based on a variety of consideration (e.g., the likelihood of a user accidentally placing their finger over a sensing area following activation of another sensing area). As an example, FIG. 3 shows the suppression periods defined according to some general "rules", but with specific exceptions for sensing area X because of its position next to the position sensitive "slider" control that is monitored by sensing areas S1 to S5. The general rules in this example are such that suppression periods for neighboring sensing area pairings are twenty cycles (regardless of which is the suppressor and which is the suppressee sensing area), and suppression periods for non-neighboring sensing area pairings are zero cycles (i.e. no suppression). These values reflect the increased likelihood of a user's finger momentarily slipping from an intended activated sensing area to a neighboring sensing area by accident, but with an assumed close to zero chance of a user's finger erroneously straying from an intended activated sensing area to a non-nearest neighbor sensing area.

However, in view of sensing area X's special position adjacent the end of the slider, increased suppression periods are defined for sensing area X as suppressee for different ones of sensing areas S1 to S5 as suppressor. Thus, sensing area X is defined to be suppressed for 100 measurement cycles following sensing S5, 80 measurement cycles following sensing S4, 60 measurement cycles following sensing S3, and so on. Furthermore, since sensing areas S1 to S5 are intended for use as a continuous slider controller, there is no suppression of any of these sensing areas following activation of any other of these sensing areas, even if they are neighbors.

It will be appreciated the specific rules and the specific magnitudes of the numbers involved in the table of FIG. 3 are in large part selected arbitrarily for this example to demonstrate the general considerations that might go into the construction of a table of suppression periods for a given user interface. Other tables may be constructed according to different rules and having different magnitudes of numbers. As an example, in a user interface having a similar layout of sensing areas to that shown in FIG. 1, but on a scale that is smaller compared to the dimensions of an expected pointing object, it may be decided that next-nearest neighbors to an activated sensing area should also be suppressed for some period. Furthermore, in a similar user interface in which measurement iterations are five-times less frequent, the numbers of measurement cycles may be five times smaller than shown in FIG. 3.

In various embodiments, a suitable suppression period table may be defined in many ways. For example, the suppression periods may be based on a qualitative assessment of what is appropriate for the layout of sensing areas and expected usage for the user interface at hand, e.g. based on similar "rules" to those used for the table shown in FIG. 3 for the user interface of FIG. 1. In other embodiments, an empirical analysis of the user interface may be used to define the suppression periods.

As an example, a test subject may be provided with a pre-production example of the user-interface that does not incorporate suppression processing in accordance with embodiments of the invention. The test subject may be instructed to select various sensing areas in various combination and the corresponding controller output used to identify the "false" positives (e.g., when a test subject is asked to slide from sensing area S1 to S5, there is a 50% chance they will go on to erroneously activate sensing area X because of overshoot). The testing may determine that in 95% of these cases the sensing area X is erroneously selected within 100 measurement cycles of sensing area S5. Thus, a suitable suppression period for the pairing of sensing areas S5 and X may be defined to be 100 measurement cycles. This predefinition of this particular suppression period may provide a balance between being able to suppress the majority of cases in which a user erroneously overshoots to sensing area X without suppressing sensing area X for so long that a user finds it unresponsive in the event they genuinely wish select it following a slide along sensing areas S1 to S5.

In some embodiments, test subject user feedback may also be used to adjust the suppression periods. As an example, a test user of the user interface may report that he finds X keeps being accidentally activated too often after a slide along the sensing areas S1 to S5. One potential solution is to increase the suppression period for sensing area X following activation of sensing area S5. Alternatively, the test user may report that he finds X to be too unresponsive after a slide along the sensing areas S1 to S5 such that the suppression period for sensing area X following activation of sensing area S5 may be decreased.

Figure 4:
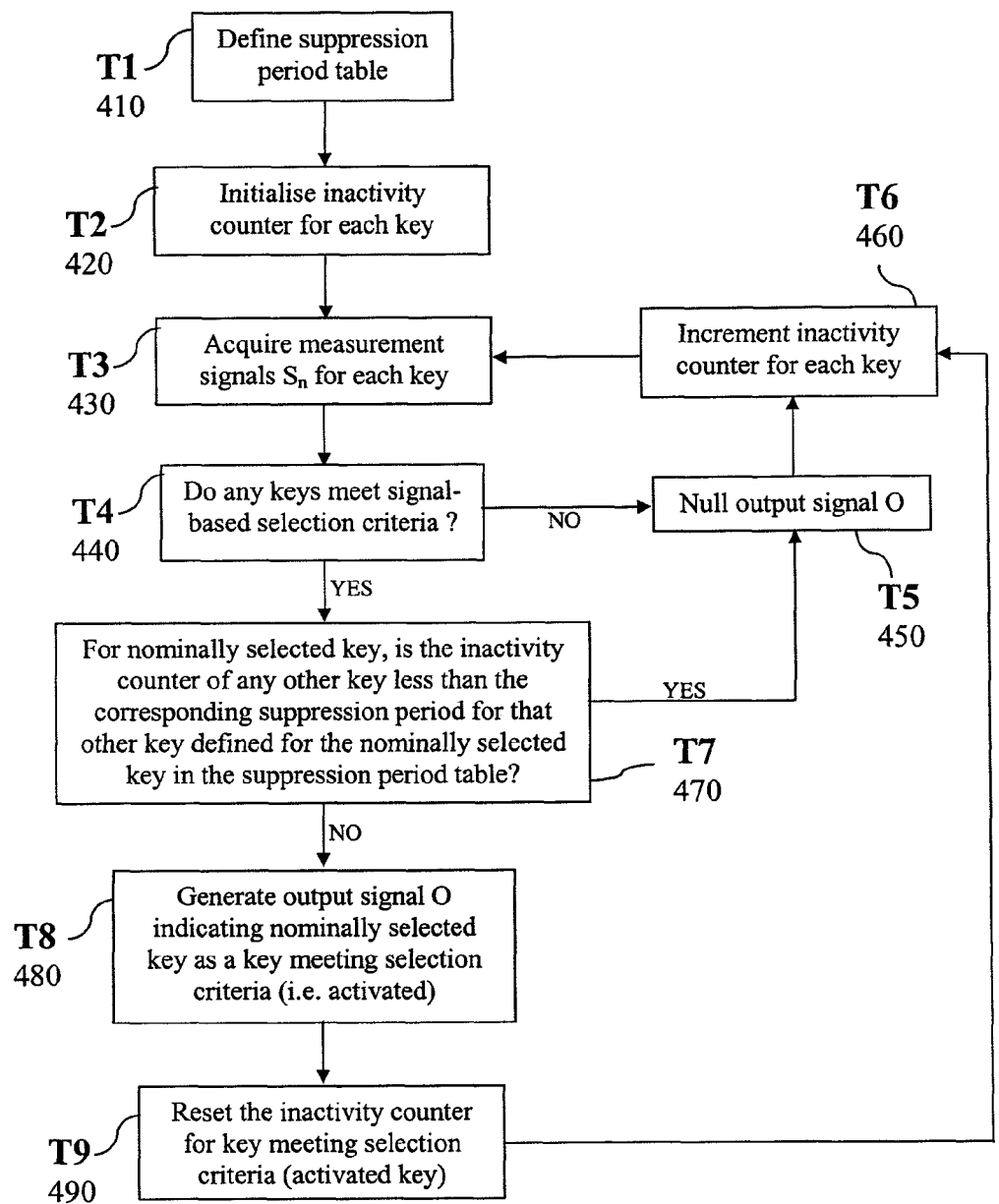
FIG. 4 is a flow diagram illustrating an example embodiment.

FIG. 4 is a flow chart illustrating an example method that may be performed by one or more components of the user interface 10 of FIG. 1. In one embodiment, controller 18 may be a micro-controller suitably configured to perform the method. The micro-controller may utilize software, hardware, firmware or any combination thereof to implement the method. In further embodiments, controller 18 may be a separate component that may be coupled to interface 10, or may be integrated with interface 10 as shown.

At T1 410 a suppression period table for the user interface is defined (see, e.g., the table shown in FIG. 3). The illustrated example table is constructed based in part on the various considerations described above for the layout of sensing areas 12 of the user interface 10, and the expected likelihood of an object to be sensed being wrongly positioned over a given sensing area following activation of another sensing area. In some embodiments, the table need only be defined once at manufacture and stored for retrieval when the user interface 10 is to be used (i.e. it does not need redefining each time the user interface is switched on, but may simply be obtained from memory). In further embodiments, the table may be modified by a user to reflect desired user preferences.

At T2 420 an inactivity period counter table is defined and initialized. In this example embodiment, the structure shown in FIG. 2 is initialized with inactivity counter periods corresponding to the maximum value of 255 for all sensing areas.

At T3 430 measurement signal values $S_n$ for the sensing areas 12 are acquired by the measurement circuit 16 and passed to the controller 18 using any technique for operating capacitance-based user interfaces.

At T4 440 the controller 18 processes the measurement signals $S_n$ to determine if any of them meet minimum instantaneous signal-based selection criteria. These signal-based selection criteria will depend on the specific implementation at hand. As an example, the signal-based selection criteria may simply be an identification of the sensing area associated with the measurement signal having the greatest maximum above a threshold. This selection criteria might be appropriate in a simple implementation where only a single sensing area is to be considered activated in any given measurement cycle. Any technique may be used at T4 440 to determine if any sensing area meets signal-based criteria that is appropriate for a particular application.

If it is determined at T4 440 that none of the measurement signals $S_n$ from the sensing areas meet the signal-based selection criteria, than the illustrated method follows the branch labeled "NO" to T5 450.

At T5 450 the controller 18 generates a null signal as output O. A master controller of the device in which the user interface 10 is incorporated (not shown in the figures) receives the null output signal O from the controller 18 of the user interface and acts accordingly (i.e., the master controller takes no action because the user interface 10 is reporting that there is no user input for the current iteration). In some embodiments, the null signal generated at T4 440 might not be a specific signal indicating no user input, but might simply correspond to the controller 18 not providing any signal whatsoever.

At T6 460 the inactivity period counter for each sensing area in the inactivity period counter table are incremented by one (up to the maximum of 255 iterations). If the inactivity period counter for a given sensing area is already at 255 iterations, the inactivity period counter remains at 255 iterations.

As shown in FIG. 4, the method goes back to T3 430 where a new set of measurement signal values $S_n$ is obtained for the next iteration. Thus, the method loops through T3 430, T4 440, T5 450 and T6 460 until it is determined in an iteration of T4 440 that one of the sensing areas is associated with a measurement signal that meets the instantaneous signal-based selection criteria. As an example, this situation might occur because a user has placed their finger over sensing area A so as to cause a sufficient change in the measurement signal associated with sensing area A such that sensing area A is nominally deemed to have been selected. In the is particular example, such a sensing area is referred to here as being "nominally" selected because while sensing area A may nominally meet the instantaneous signal-based selection criteria applied at T4 440 (which as noted above may be based on conventional criteria), it may still be suppressed from being deemed activated for the current measurement signal.

When one of the sensing areas meets the signal-based selection criteria of T4 440, the method proceeds to T7 470. At T7 470 the controller 18 determines whether or not the particular sensing area that meets the signal-based selection criteria of T4 440 should nonetheless be suppressed from activation in the current iteration according to temporal-based selection criteria. In some embodiments, The controller 18 compares the predefined suppression periods associated with the nominally selected sensing area and each of the other sensing areas with the corresponding counter values in the inactivity period counter value table for the current iteration. If the predefined suppression period associated with a pairing of the nominally selected sensing area and any one of the other sensing areas is more than the current inactivity period counter value for the other sensing area, the nominally selected sensing area is suppressed from activation.

Thus, returning to the particular example discussed above, sensing area A is taken to be the first sensing area to meet the signal-based selection criteria of T4 440 (i.e., because the device is switched on). Accordingly, in the iteration in which this occurs, the counter values in the inactivity period counter table are all at 255 (i.e., all the sensing areas are indicated as having been inactive for the at least the maximum recordable value of 255 iterations). The predefined suppression periods for sensing area A after activation of another sensing area are all less than 255 iterations, as indicated in column "A" of the suppression period table shown in FIG. 3 (i.e., the predefined suppression periods are zero iterations for sensing areas C, D, S3, S4, S5 and X; and twenty iterations for sensing areas B, S1 and S2). Since none of the current inactivity period counters for the other sensing areas in this example are less than their corresponding predefined suppression periods associated with nominally selected sensing area A, the nominally selected sensing area is not suppressed and the method goes on to T8 480.

At T8 480 the controller 18 generates an output signal O indicating that sensing area A is to be considered an activated sensing area for the current iteration. The master controller of the device in which the user interface is incorporated receives this signal and responds accordingly. T8 480 may be described more generally as the controller 18 generating output signals O indicating whichever sensing areas were identified as meeting the signal-based selection criteria of T4 440, and which were not suppressed for failing to meet the temporal-based selection criteria of T7 470.

As shown in FIG. 4, the method goes on to T9 490 where the inactivity period counter value for the sensing area that is deemed to be activated in the current iteration is set to zero. The method then goes back to T6 460, where as described above, the inactivity period counter for each sensing area in the inactivity period counter table is incremented by one (up to the maximum of 255 iterations). If the inactivity period counter for a given sensing area is already at 255 iterations, the inactivity period counter remains at 255 iterations. The method then goes back to T3 430 where a new set of measurement signal values $S_n$ is obtained for the next iteration.

However, if it is determined at T7 470 that one (or more) of the current inactivity period counters for the sensing areas other than the nominally selected sensing area is less than the corresponding predefined suppression period, the nominally selected sensing area is suppressed from activation. In this particular example, the method then goes from T7 470 back to T5 450. Thus, the method provides a mechanism through T7 470 whereby sensing areas may be suppressed from activation for predefined periods after activation of another sensing area.

As an example of this type of activation suppression, reference is made again to measurement iteration N for which the inactivity period counters are shown in the table of FIG. 2. The table in FIG. 2 shows that sensing area C was last considered activated in the previous iteration. Assuming that a user activated sensing area C as desired and then lifted their finger away from the sensor element 14 of the user interface, but in doing so accidentally slipped briefly onto sensing area D.

In some embodiments, these actions will cause T4 440 of iteration N, sensing area D to be found to meet the signal-based criteria for selection. However, while sensing area D is nominally selected at T4 440 of iteration N, sensing area D is suppressed in T7 470.

This suppression is because at T7 470 the controller 18 will find that the predefined suppression period for sensing area D following activation of sensing area C is twenty iterations, and this suppression period is more that the current inactivity period counter value for sensing area C (one iteration). Therefore, as shown in FIG. 4, the result of the test at T7 470 causes the method to move from T7 470 to T5 450 where the controller 18 provides a null output.

FIG. 4 shows one example method, but there are many modifications that may be made to the method in other embodiments. As an example, the elements of the method may be performed in a different order (T1 410 and T2 420 may be reversed). In addition, T7 470 and T4 440 may be swapped such that the temporal selection criteria at T7 470 may be applied before the instantaneous signal-based selection criteria at T4 440 (i.e., the sensing areas may be excluded from further consideration by applying the temporal selection criteria set out in relation to T7 470 of FIG. 4 for all sensing areas, and not just nominally selected sensing areas). Other types of signal-based selection criteria may then be applied to those sensing areas not excluded by the temporal selection criteria.

Furthermore, different ways of incrementing and resetting the inactivity counters may be used. As an example, the inactivity counter for a key that remains activated for a number of successive iterations will oscillate between "1" and "0" (i.e., the inactivity counter will be alternately reset to "0" at T9 490 and incremented to "1" at T6 460 of each iteration). If this oscillation is not desired, T6 460 may be modified such that any key considered as being activated in a given iteration does not have it's activity counter incremented in the modified version of T6 460 for that iteration. In some embodiments, the inactivity counter of an activated key may be allowed to increment along with all the other keys while it remains in activation, and then only reset once the particular activated key ceases to be activated.

In some embodiments, the user interface may include multiple sensing areas that may be activated per measurement iteration. Thus, multiple nominally selected sensing areas may be carried forward from an element corresponding to T4 440 with each being checked separately in an element corresponding to T7 470. Only those sensing areas meeting both the instantaneous signal selection criteria and the temporal selection criteria may be indicated through the output signal O from the controller as being considered activated in a given iteration.

In the example embodiments described above, the suppression scheme provides for an absolute bar on activation of a sensing area within the predefined suppression period associated with a previous activation of another sensing area. In other embodiments, the suppression might not be absolute.

As an example, the suppression scheme may be such that a sensing area merely has a reduced likelihood of being considered activated during an ongoing "live" suppression period after recent activation of another sensing area. A sensing area that would be completely suppressed in the embodiment shown in FIG. 4 may be allowed to become activated in another embodiment (even within an ongoing "live" suppression period if the measurement signal were to meet stricter signal-based criteria). In some embodiments, a sensing area might overcome what would otherwise be complete suppression in an ongoing suppression period if it were to be associated with a particularly high signal, or if the sensing area were to continue to meet the instantaneous signal-based criteria for a given number of successive iterations.

Figure 5:
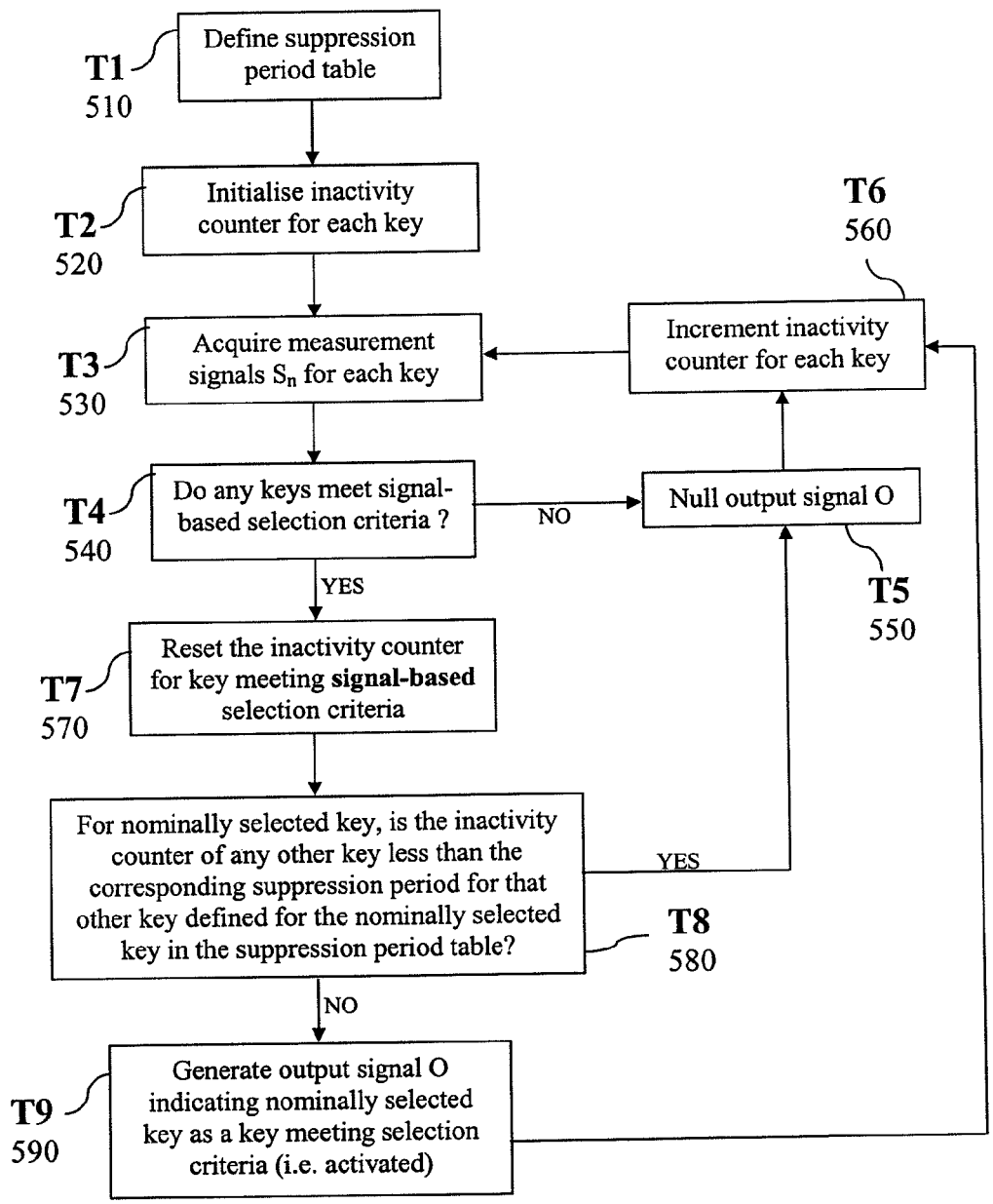
FIG. 5 is a flow diagram illustrating another example embodiment.

FIG. 5 is a flow chart illustrating another example method that may be performed by one or more components of the user interface 10 of FIG. 1. At T1 510 a suppression period table for the user interface is defined (see, e.g., the table shown in FIG. 3).

At T2 520 an inactivity period counter table is defined and initialized. In this example embodiment, the structure shown in FIG. 2 is initialized with inactivity counter periods corresponding to the maximum value of 255 for all sensing areas.

At T3 530 measurement signal values $S_n$ for the sensing areas 12 are acquired by the measurement circuit 16 and passed to the controller 18 using any technique for operating capacitance-based user interfaces.

At T4 540 the controller 18 processes the measurement signals $S_n$ to determine if any of them meet minimum instantaneous signal-based selection criteria. These signal-based selection criteria will depend on the specific implementation at hand. As an example, the signal-based selection criteria may simply be an identification of the sensing area associated with the measurement signal having the greatest maximum above a threshold. This selection criteria might be appropriate in a simple implementation where only a single sensing area is to be considered activated in any given measurement cycle. Any technique may be used at T4 440 to determine if any sensing area meets signal-based criteria that is appropriate for a particular application.

If it is determined at T4 540 that none of the measurement signals $S_n$ from the sensing areas meet the signal-based selection criteria, than the illustrated method follows the branch labeled "NO" to T5 550.

At T5 550 the controller 18 generates a null signal as output O. A master controller of the device in which the user interface 10 is incorporated (not shown in the figures) receives the null output signal O from the controller 18 of the user interface and acts accordingly (i.e., the master controller takes no action because the user interface 10 is reporting that there is no user input for the current iteration). In some embodiments, the null signal generated at T4 440 might not be a specific signal indicating no user input, but might simply correspond to the controller 18 not providing any signal whatsoever.

At T6 560 the inactivity period counter for each sensing area in the inactivity period counter table are incremented by one (up to the maximum of 255 iterations). If the inactivity period counter for a given sensing area is already at 255 iterations, the inactivity period counter remains at 255 iterations.

As shown in FIG. 5, the method goes back to T3 530 where a new set of measurement signal values $S_n$ is obtained for the next iteration. Thus, the method loops through T3 530, T4 540, T5 550 and T6 560 until it is determined in an iteration of T4 540 that one of the sensing areas is associated with a measurement signal that meets the instantaneous signal-based selection criteria.

When one of the sensing areas meets the signal-based selection criteria of T4 540, the method proceeds to T7 570, where the inactivity period counter value for the sensing area that is deemed to be nominally selected in the current iteration is set to zero.

At T8 580 the controller 18 determines whether or not the particular sensing area that meets the signal-based selection criteria of T4 540 should nonetheless be suppressed from activation in the current iteration according to temporal-based selection criteria. In some embodiments, the controller 18 compares the predefined suppression periods associated with the nominally selected sensing area and each of the other sensing areas with the corresponding counter values in the inactivity period counter value table for the current iteration. If the predefined suppression period associated with a pairing of the nominally selected sensing area and any one of the other sensing areas is more than the current inactivity period counter value for the other sensing area, the nominally selected sensing area is suppressed from activation.

At T9 590 the controller 18 generates an output signal O indicating that sensing area A is to be considered an activated sensing area for the current iteration. The master controller of the device in which the user interface is incorporated receives this signal and responds accordingly. T9 590 may be described more generally as the controller 18 generating output signals O indicating whichever sensing areas were identified as meeting the signal-based selection criteria of T4 640, and which were not suppressed for failing to meet the temporal-based selection criteria of T8 580.

As shown in FIG. 5, the method then goes back to T6 560, where as described above, the inactivity period counter for each sensing area in the inactivity period counter table is incremented by one (up to the maximum of 255 iterations). If the inactivity period counter for a given sensing area is already at 255 iterations, the inactivity period counter remains at 255 iterations. The method then goes back to T3 530 where a new set of measurement signal values $S_n$ is obtained for the next iteration.

However, if it is determined at T8 580 that one (or more) of the current inactivity period counters for the sensing areas other than the nominally selected sensing area is less than the corresponding predefined suppression period, the nominally selected sensing area is suppressed from activation. In this particular example, the method then goes from T8 580 back to T5 550. Thus, the method provides a mechanism through T8 580 whereby sensing areas may be suppressed from activation for predefined periods after activation of another sensing area.

The methods illustrated in FIGS. 4 and 5 may help address some of the problems that are associated with conventional user-interfaces by providing a scheme in which a sensing area may be prevented from being activated for a predefined period of time after another sensing area has been activated. In addition, the activation of different sensing areas of the user interface may be suppressed for different periods of time in response to different sensing areas have been previously activated in accordance with a defined suppression period table.

Figure 6:
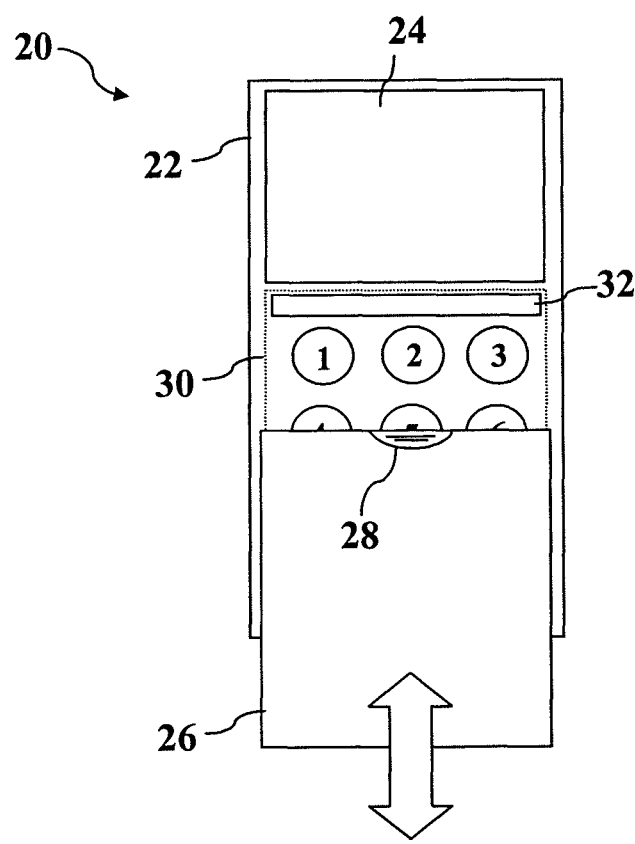
FIG. 6 is a schematic view illustrating a device incorporating a touch-sensitive sensor according to an example embodiment.

FIG. 6 is a schematic view illustrating an example device 20 that incorporates a user interface 30. In the illustrated example embodiment, the device 20 is a cellular telephone 20 comprising a housing 22, a display screen 24, the user interface 30, and sliding cover 26. The sliding cover 26 may be slid over the sensing element surface of the user interface 30 to protect it (e.g., from scratches and/or accidental activation). The sliding cover may be moved down by a user applying a suitable force at a finger notch 28.

The user interface 30 includes a three-by-four array of touch sensitive sensing areas that define a conventional telephone keypad array (not all of the sensing areas visible in FIG. 6). The user interface 30 further includes a guard sensing area 32 extending across the top of the sensor element of the user interface 30.

During operation when a user slides the sliding cover 26 down to expose the user interface, there is a risk that an appendage (i.e., finger or thumb) will accidentally activate sensing areas of the telephone keypad as it is dragged past them. The guard sensing area 32 may help prevent this undesirable situation. Thus, a controller of the user interface is configured to suppress activation of each of the sensing areas of the telephone keypad for a predefined time after the guard sensing area 32 is activated.

The guard sensing area 32 will typically be the first sensing area to be activated because it is adjacent the top of the sliding cover where the user places their finger to slide the cover open. Thus, the remaining sensing areas may be suppressed for a period corresponding to the typical time to open the sliding cover. This approach is much simpler than requiring a user to manually "lock" and "unlock" the keyboard, or using a separate switch mechanism to indicate whether or not the sliding cover is open or closed.

While the above example embodiments are based on a sensor element having physically discrete electrode material providing physically discrete sensing areas, similar principles may be applied to sensor elements that provide for a continuous coordinate output which is mapped to virtual sensing areas. In this type of embodiment, the measurement signals from the measurement circuit would comprise an indication of the virtual button(s) associated with the determined coordinates of an object (objects) over the sensor element.

In addition, although the above description has focused primarily on embodiments that are based on capacitive sensing techniques, similar methods may be applied to user interfaces that are based on other sensing techniques which provide measurement signals indicative of a degree of coupling between a sensing element and an object (e.g., a user interface having sensing areas provided by heat or pressure sensitive sensors).

Thus, there has been described a touch-sensitive user interface comprising a sensor element that includes a plurality of keys, a measurement circuit coupled to the sensor element and operable to iteratively acquire measurement signal values indicative of the proximity of an object to the respective keys, and a processor operable to receive the measurement signal values from the measurement circuit and to classify a key as an activated key for a current iteration according to predefined selection criteria, wherein the predefined selection criteria are such that activation of at least a first key in a current iteration is suppressed if at least a second key has previously been classified as an activated key within a predefined period before the current iteration.

In some embodiments, a key may be prevented from being activated for a predefined period of time after another key has ceased to be considered activated. Furthermore, activation of different keys may be suppressed for different periods of time in response to one or more other keys having been previously activated. This can help reduce unintended activations of keys.

Further particular and preferred aspects of the present invention are set out in the accompanying independent and dependent claims. It will be appreciated that features of the dependent claims may be combined with features of the independent claims as appropriate, and in combinations other than those explicitly set out in the claims.

What is claimed is:

1. A touch-sensitive user interface comprising:
    a sensor element having a plurality of sensing areas, each of the plurality of sensing areas being selectively activated when an object is placed by a user in the proximity of a selected one of the plurality of sensing areas;
    a measurement circuit coupled to the sensor element and operable to acquire at least one measurement signal value indicative of the proximity of the object to the selected one of the plurality of sensing areas; and
    a processor operable to:
        receive a first measurement signal value indicating the selection by the user of a first sensing area of the plurality of sensing areas;
        classify the first sensing area as an activated sensing area;
        receive a second measurement signal value indicating the selection by the user of a second sensing area of the plurality of sensing areas;
        determine that the second measurement signal value was received within a predetermined period of time after the first sensing area was classified as an activated sensing area; and
        in response to determining that the second measurement signal value was received within the predetermined period of time, suppress activation of the second sensing area as the activated sensing area.

2. The touch-sensitive user interface of claim 1, wherein the predefined period for suppressing activation of the second sensing area following activation of the first sensing area is dependent on a spatial relationship between the first and second sensing areas within the sensor element.

3. The touch-sensitive user interface of claim 1, wherein:
    the measurement circuit is operable to acquire a plurality of iterations of measurement signals values, each iteration comprising a plurality of measurement signal values for the plurality of sensing areas; and
    the processor is operable to suppress the activation of the second sensing area in a current iteration in response to determining that the first sensing area was previously classified as the activated sensing area in a previous iteration occurring within the predefined period before the current iteration.

4. The touch-sensitive user interface of claim 3, wherein the predefined period corresponds to a predefined number of measurement signal acquisition iterations.

5. The touch-sensitive user interface of claim 4, wherein the processor is operable to maintain a counter value representing an inactivity period for the first sensing area, the inactivity period being a time from when the first sensing area was last activated, and wherein the processor is operable to compare the counter value for the first sensing area for a current iteration with the predefined number of measurement signal acquisition iterations corresponding to the predefined period for suppressing the second sensing area following activation of the first sensing area.

6. The touch-sensitive user interface of claim 1, wherein the processor is further operable to:
    based on the at least one measurement signal value, classify a third sensing area as being an activated sensing area;
    determine that the first sensing area or the second sensing area were previously classified as an activated sensing area within a predefined period before the third sensing area was classified as the activated sensing area; and
    in response to determining that the second sensing area was previously classified as the activated sensing area within the predefined period, suppress activation of the third sensing area as the activated sensing area.

7. The touch-sensitive user interface of claim 4, wherein the predefined period for suppressing activation of the third sensing area following activation of the first sensing area or the second sensing area is different from the predefined period for suppressing activation of the first sensing area following activation of the second sensing area.

8. The touch-sensitive user interface of claim 1, wherein the predefined period corresponds to a predefined time duration.

9. The touch-sensitive user interface of claim 1, wherein the first sensing area is a first plurality of sensing areas and the second sensing area is a second plurality of sensing areas such that activation of some of the second plurality of sensing areas in a current iteration is suppressed if some of the first plurality of sensing areas have been previously classified as activated sensing areas within different predefined periods before the current iteration.

10. The touch-sensitive user interface of claim 9, wherein at least one sensing area is common to both the first plurality of sensing areas and the second plurality of sensing areas.

11. The touch-sensitive user interface of claim 10, wherein the first plurality of sensing areas and the second plurality of sensing areas include some of the same sensing areas.

12. The touch-sensitive user interface of claim 9, wherein the different predefined periods depend on the respective spatial relationships between some of the sensing areas in the first plurality of sensing areas and some of the sensing areas in the second plurality of sensing areas.

13. A method comprising:
    receiving a first measurement signal value indicating a placement of an object by a user within a proximity of a first sensing area of a plurality of sensing areas in a touch-sensitive user interface;
    classifying the first sensing area as an activated sensing area;
    receiving a second measurement signal value indicating the selection by the user of a second sensing area of the plurality of sensing areas;

determining that the second measurement signal value was received within a predefined period of time after the first sensing area was classified as the activated sensing area; and in response to determining that the second measurement signal value was received within the predefined period of time, suppressing activation of the second sensing area as the activated sensing area.

14. The method of claim 13, wherein the predefined period for suppressing activation of the second sensing area following activation of the first sensing area is dependent on a spatial relationship between the first and second sensing areas within the sensor element.

15. The method of claim 13, further comprising acquiring a plurality of iterations of measurement signals values, each iteration comprising a plurality of measurement signal values for the plurality of sensing areas, and wherein the first measurement signal value is received in a previous iteration and the second measurement signal value is received in a current iteration, wherein activation of the second sensing area is suppressed in the current iteration in response to determining that the first sensing area was previously classified as the activated sensing area in the previous iteration occurring within the predefined period before the current iteration.

16. The method of claim 15, wherein the predefined period corresponds to a predefined number of measurement signal acquisition iterations.

17. The method of claim 16, further comprising:

maintaining a counter value representing an inactivity period for the first sensing area, the inactivity period being a time from when the first sensing area was last activated; and comparing the counter value for the first sensing area for a current iteration with the predefined number of measurement signal acquisition iterations corresponding to the predefined period for suppressing the second sensing area following activation of the first sensing area.

18. The method of claim 13, further comprising:

based on the at least one measurement signal value, classifying a third sensing area as being an activated sensing area;

determining that the first sensing area or the second sensing area were previously classified as an activated sensing area within a predefined period before the third sensing area was classified as the activated sensing area; and in response to determining that the first sensing area or the second sensing area were previously classified as the activated sensing area within the predefined period, suppressing activation of the third sensing area as the activated sensing area.

19. The method of claim 18, wherein the predefined period for suppressing activation of the third sensing area following activation of the first sensing area or the second sensing area is different from the predefined period for suppressing activation of the second sensing area following activation of the first sensing area.

20. The method of claim 13, wherein the predefined period corresponds to a predefined time duration.

21. The method of claim 13, wherein the first sensing area is a first plurality of sensing areas and the second sensing area is a second plurality of sensing areas such that activation of some of the second plurality of sensing areas in a current iteration is suppressed if some of the first plurality of sensing areas have been previously classified as activated sensing areas within different predefined periods before the current iteration.

22. The method of claim 21, wherein at least one sensing area is common to both the first plurality of sensing areas and the second plurality of sensing areas.

23. The method of claim 22, wherein the first plurality of sensing areas and the second plurality of sensing areas include some of the same sensing areas.

24. The method of claim 21, wherein the different predefined periods depend on the respective spatial relationships between some of the sensing areas in the first plurality of sensing areas and some of the sensing areas in the second plurality of sensing areas.

25. A controller comprising:

a processor operable to acquire a measurement signal value and, based on predefined selection criteria, classify a first sensing area associated with the measurement signal as being an activated sensing area, wherein the predefined selection criteria are such that activation of the first sensing area as the activated sensing area is suppressed when a second sensing area was previously classified as an activated sensing area within a predefined period before the second sensing area was classified as an activated sensing area.

* * * * *